United States Patent [19]
Kawiecke

[11] 3,813,577
[45] May 28, 1974

[54] OVERVOLTAGE PROTECTION APPARATUS HAVING FUSIBLE RING AND SHORT CIRCUIT MEANS OPERATED THEREBY

[75] Inventor: Chester J. Kawiecke, Santa Barbara, Calif.

[73] Assignee: Joslyn Mfg. and Supply Co., Chicago, Ill.

[22] Filed: Dec. 20, 1972

[21] Appl. No.: 316,738

[52] U.S. Cl.................. 317/16, 317/31, 317/40 A, 317/62, 337/32
[51] Int. Cl. ............................................ H02h 3/20
[58] Field of Search ................ 317/16, 31, 62, 66; 337/32, 33; 317/40 A

[56] References Cited
UNITED STATES PATENTS

| | | | |
|---|---|---|---|
| 2,219,705 | 10/1940 | Jones | 337/33 X |
| 2,724,793 | 11/1955 | Fisher | 317/66 |
| 3,340,431 | 9/1967 | Wanaselja | 337/9 R |
| 3,522,570 | 8/1970 | Wanaselja | 337/32 X |
| 3,535,582 | 10/1970 | Kawiecki | 315/36 |

*Primary Examiner*—James D. Trammell
*Attorney, Agent, or Firm*—Klarquist, Sparkman, Campbell, Leigh, Hall & Whinston

[57] ABSTRACT

An overvoltage protection apparatus is described in which a fusible ring of low melting termperature metal is provided in contact around an intermediate ground electrode of the overvoltage protection device. The fusible ring is engaged by spring biased mounting clips connected to ground which move inwardly to short circuit the end terminals of such device to ground upon melting of such ring.

10 Claims, 4 Drawing Figures

PATENTED MAY 28 1974 3,813,577

OVERVOLTAGE PROTECTION APPARATUS HAVING FUSIBLE RING AND SHORT CIRCUIT MEANS OPERATED THEREBY

BACKGROUND OF INVENTION

The subject matter of the present invention relates generally to overvoltage protection apparatus for protecting electronic circuits in equipment, such as telephones, from destruction due to overvoltage conditions caused by lightning or other electrical faults, including accidental contact with high voltage power lines. More particularly, the overvoltage protection apparatus of the present invention includes an overvoltage protection device having a fusible ring of low melting temperature metal alloy provided around such device between an intermediate ground electrode of such device and a pair of spring biased mounting clips connected to ground so that when such fusible ring melts, such clips move inwardly to short circuit the end terminals of such device to ground.

Prior overvoltage protection apparatus, such as that shown in U.S. Pat. No. 3,281,625, granted Oct. 25, 1966, and U.S. Pat. No. 3,340,431, granted Sept. 5, 1967, both to O. Wanaselja, employ fusible members of an H-shape which upon melting allow a shorting member separate from the grounded mounting clips engaging the intermediate electrode, to move into contact with the end terminals of the overvoltage protection device to short circuit such end terminals. However, the overvoltage protection apparatus of the present invention operates in a much faster and more trouble free manner than these prior apparatuses, due to the ring shape of the fusible member and the use of a pair of spring biased mounting clips to ground the intermediate ground electrode of the overvoltage protection device through such fusible ring. As a result, fault current flows to ground through the fusible ring and such ring contacts the entire periphery of the intermediate electrode for better heat conduction from such electrode. For example, in a typical overvoltage operation, the fusible ring of the present invention melts in about one second or less, while the fusible H-shaped members of the prior apparatus require on the order of 3 to 4 seconds to melt before short circuiting the overvoltage protection device. This usually results in destruction of the overvoltage protection device when using the prior apparatus which does not happen as often with the present apparatus. Another problem with the prior apparatus is that the H-shaped fusible members are easily lost since they are separate from the overvoltage protection device. This problem is eliminated in the present apparatus because the fusible ring is attached to the device so that it cannot be separated therefrom, except by melting.

The present apparatus employs a pair of sleeves of plastic insulating material around the envelope of the overvoltage protection device on opposite sides of its central ground electrode which keeps the end electrodes of such device clean and its ceramic envelope members free of surface contamination. In addition, the plastic sleeves provide a longer voltage creepage path between the end terminals of such sleeves to prevent breakdown along the outer surface of the device. These plastic sleeves hold the fusible ring in position on the central electrode and may be removed for replacement of such fusible ring after melting so that the overvoltage device may be reused if it is not damaged internally.

In addition, the end electrodes of the overvoltage protection device are connected to terminal members having annular notches therein for mounting on spring contacts attached to the base member of insulating material. These terminal members increase the length of the overvoltage protection device so that it may be manually handled and installed more easily while maintaining the same voltage breakdown characteristics of the smaller device. Furthermore, the high voltage protection apparatus of the present invention employs a much simpler mounting clip and short circuiting means of fewer parts and more reliable operation than that of the above-mentioned patents.

It is, therefore, one object of the present invention to provide an improved overvoltage protection apparatus of simple construction having a short circuiting means of faster operation.

Another object of the invention is to provide such an apparatus with a fusible ring member around an intermediate ground electrode of the overvoltage protection device which melts in a short time during an overvoltage condition due to improved heat conduction to cause the end electrodes of the device to be short circuited quickly to prevent destruction of such device, except under extreme conditions.

A further object of the invention is to provide such an overvoltage protection apparatus in which the mounting clips and short circuiting arms are formed on the same members which have a reliable jam-proof operation.

Still another object of the invention is to provide such an overvoltage protection apparatus in which the fusible ring provides the only current path between ground and the intermediate electrode of the overvoltage protection device so that the fusible ring is heated directly by such ground current as well as by heat conduction from such electrode to enable faster melting thereof.

A still further object of the invention is to provide such an overvoltage protection apparatus in which a pair of sleeves of plastic insulating material are provided around the envelope of the overvoltage protection device on opposite sides of the fusible ring to hold it in position so that such ring can be replaced by removal of such sleeves, to protect the end electrodes and envelope from breakage or contamination, and provide a longer voltage creepage path between the end terminals of such device to prevent breakdown between such terminals along the external surface of such device.

BRIEF DESCRIPTION OF DRAWINGS

Additional objects and advantages of the present invention will be apparent from the following detailed description of a preferred embodiment thereof and from the attached drawings of which.

DESCRIPTION OF PREFERRED EMBODIMENT

Figure 1:
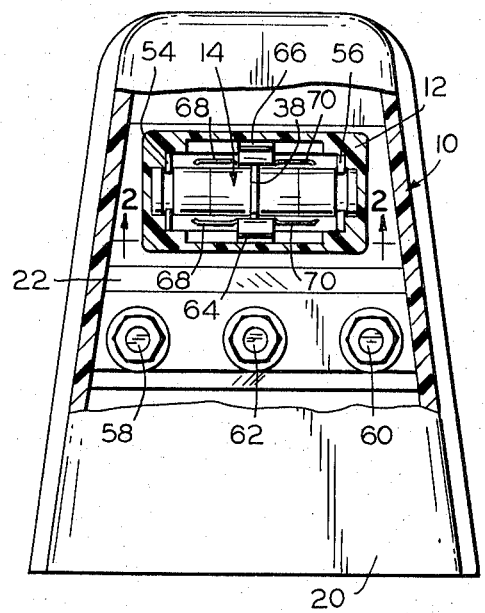
FIG. 1 is a plan view of the top of the overvoltage protection apparatus of the present invention with a portion of the cover broken away for purposes of clarity.

As shown in FIG. 1, one embodiment of the overvoltage protection apparatus of the present invention icludes a housing 10 of plastic insulating material containing a hollow holder member 12 of transparent plastic insulating material and an overvoltage protection device 14 of the type disclosed in U.S. Pat. No. 3,535,582 of C. J. Kawiecki, granted October 20, 1970. The overvoltage protection device 14 may be secured by a pair of detent projections 16 and 18 adjacent the ends of guide slots on the inner surface of the holder member, as shown in copending U.S. patent application, Ser. No. 316,737, filed Dec. 20, 1972, by C. J. Kawiecki, entitled OVERVOLTAGE PROTECTOR HOLDER AND HOUSING. The housing 10 includes a flexible plastic cover member 20 releasably attached to a rigid plastic base member 22 by a suitable detent locking means shown in such copending patent application.

Figure 4:
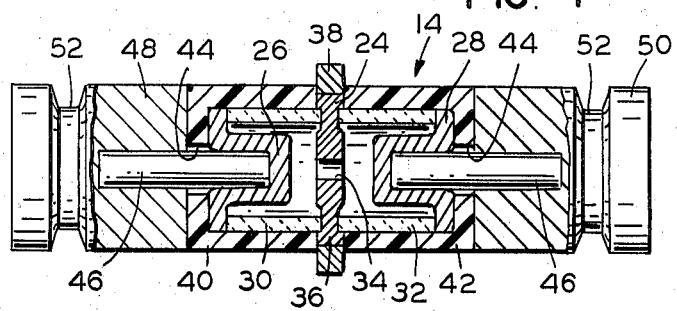
FIG. 4 is a longitudinal section view of one embodiment of an overvoltage protection device which can be employed in the apparatus of FIGS. 1 to 3.

As shown in FIG. 4, the overvoltage protection device 14 includes a gas-tight envelope containing a central ground electrode 24 and a pair of end electrodes 26 and 28 on opposite sides thereof which are hermetically sealed to the ends of a pair of cylindrical envelope members 30 and 32 of glass, or a ceramic material such as alumina. The envelope contains a radioactive gas which breaks down at a predetermined voltage difference of, for example, 350 volts when the normal A.C. operating voltage is 120 volts r.m.s., across the two spark gaps between the end electrodes 26, 28 and the intermediate ground electrode 24. This device is described in greater detail in copening U.S. patent application, Ser. No. 316,736, filed Dec. 20, 1972, by C. J. Kawiecki, entitled SPARK GAP DEVICE. The ground electrode 24 is provided with a central aperture 34 extending therethrough, among other reasons for gas communication between the ceramic envelope members 30 and 32.

The intermediate ground electrode 24 extends completely through the ceramic envelope members 30, 32 and has an external flange portion 36 projecting outwardly from the exterior surface of such ceramic members. A fusible ring 38 of low melting temperature metal, such as lead-tin alloy, is positioned around the envelope of the overvoltage protection device in contact with the external flange portion 36 of the ground electrode 24. This fusible ring has a lower melting temperature than the electrodes 24 which may be made of the cobalt-nickel alloy, sold under the trademark "Kovar." While the fusible ring 38 may be soldered or otherwise fixed to the central electrode 24, it may also be releasably secured thereto by friction and held in position between a pair of sleeve members 40 and 42 of plastic insulating material, such as polytetrafluoroethylene, sold under the trademark "Teflon." The plastic sleeves 40 and 42 are positioned over the ceramic envelope members 30 and 32 and extend across the end electrodes 26 and 28 except for a central opening 44 in the end of such sleeves through which a tubular connector member 46 extends. The connector member 46 is made of rolled sheet metal which resiliently engages the wall of a cavity formed in such end electrodes 26 and 28 by their re-entrant shape. A pair of electrical terminal members 48 and 50 of brass or other suitable metal are provided on the opposite ends of the overvoltage protection device and are connected to end electrodes 26 and 28, respectively through the connectors 46 extending into cavities in such end terminals. Each of the end terminals 48 and 50 is provided with an annular notch 52 in its outer surface for engagement with a pair of electrical contacts 54 and 56 attached to the base member 22.

The electrical contacts 54 and 56 are connected in a conventional manner to terminals 58 and 60, respectively, each in the form of a threaded stud having a nut thereon for attachment to input and output conductors of a cable extending into the housing 10. In addition, a ground terminal 62 is provided on the base member 22 and electrically connected to a pair of spring biased mounting clips 64 and 66, which engage the fusible ring 38 to ground such ring and the central electrode 24 of the overvoltage protection device.

Figure 2:
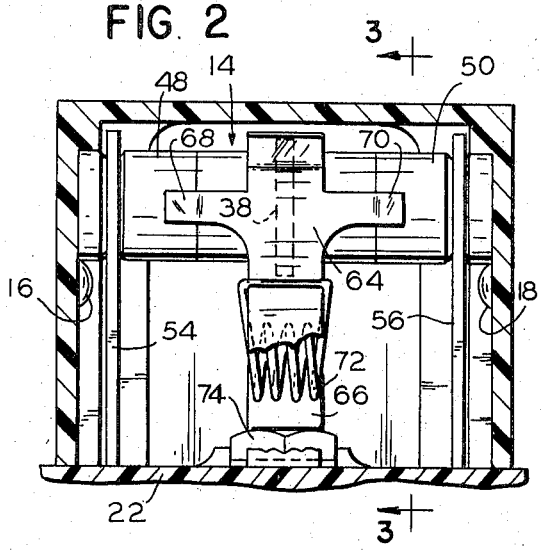
FIG. 2 is a horizontal section view taken generally along the line 2—2 of FIG. 1 on an enlarged scale.

The mounting clip members 64 and 66 are each of a cross shape, as shown in FIG. 2, and have a pair of opposite extending arm portions 68 and 70 which are spaced outwardly from the end terminals 48 and 50, respectively, of the overvoltage device by the fusible ring 38. The melting of the fusible ring 38 causes the cross arm members 68 and 70 to be moved inwardly by a spring 72 into contact with end terminals 48 and 50 to short circuit them to ground. Clip members 64 and 66 also act as springs and the coil spring 72 merely aids them to provide greater spring holding force which insures good electrical contact. Thus, melting of the fusible ring 38 causes a fail-safe operation in which the end terminals of the overvoltage device are not only short circuited but also connected to ground so that no further current can flow through such device.

Figure 3:
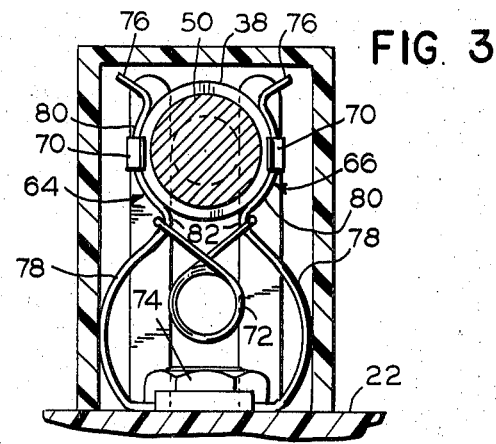
FIG. 3 is a vertical section view taken along the line 3—3 of FIG. 2.

The spring 72 is a "clothespin" type of coil spring positioned between the mounting clip members 64 and 66, with one end of such spring attached to member 64 and its other end attached to member 66, as shown in FIG. 3. Thus, the spring 72 resiliently urges such clip members together so that the central portion of such members engages the fusible ring 38 and holds the overvoltage protection device 14 in place. The lower ends of the mounting clip members 64 and 66 are secured by a bolt and nut fastener 74 to the base member 22 of insulating material. The upper ends 76 of the mounting clip members flare outwardly to enable easier insertion of the overvoltage protection device 14 and its associated fusible ring 38 between such mounting clip members. It should be noted that the two mounting clip members 64 and 66 may be made from a single strip of spring metal, such as phosphor bronze, which is bent into the shape shown in FIG. 3.

Each clip member 64 and 66 has a pair of arcuate central portions 78 and 80 which bend outwardly above and below an intermediate portion 82 engaging the ends of the coil spring 72. The lower arcuate portion 78 has a bigger radius of curvature than the upper arcuate portion 80, while such upper portion has a radius of curvature substantially the same as that of the fusible ring 38 so that it contacts such ring over a large portion of its periphery. Also, it should be noted that the cross arm portions 68 and 70 are bowed slightly outward to provide resilient spring contacts when such arms engage the end terminals 48 and 50.

It will be obvious to those having ordinary skill in the art that many changes may be made in the details of the above-described preferred embodiment of the present invention. For example, other types of overvoltage protection devices can be employed. Therefore, the scope of the present invention should only be determined by the following claims.

I claim:

1. An overvoltage protection apparatus in which the improvement comprises:

an overvoltage protection device including a sealed envelope and a plurality of electrodes supported in spaced insulated relationship to provide a spark gap within said envelope; and an external fusible ring of metal having a lower melting temperature than said electrodes, said fusible ring being mounted on said device in a position external to said envelope with said ring surrounding and in contact with one of said electrodes.

2. Apparatus in accordance with claim 1 in which a pair of sleeves of plastic material are provided over the envelope of said device on opposite sides of the fusible ring.

3. Apparatus in accordance with claim 2 in which said one electrode is an intermediate electrode positioned between two end electrodes and a pair of terminal members are provided over the outer ends of said sleeves and are connected to said end electrodes by connectors.

4. Apparatus in accordance with claim 3 in which said connectors are separate members extending through openings in said sleeves and into cavities formed in said terminal members and said end electrodes.

5. Apparatus in accordance with claim 4 in which the connectors engage the walls of said cavity for releasably connecting the terminal members to the other electrodes.

6. Apparatus in accordance with claim 1 including a base member of insulating material having thereon a plurality of spaced insulated electrical contacts including a pair of signal contacts which are releasably connected to a pair of end electrodes on opposite sides of said one electrode of said device, and a movable ground contact means engaging said fusible ring for grounding said one electrode and normally spacing said ground contact means away from said end electrodes in an open circuit position, and for moving said ground contact means upon melting of said ring, from said open circuit position into a short circuit position relative to said end electrodes to short circuit them together.

7. Apparatus in accordance with claim 6 in which the ground contact means includes a pair of movable contacts on opposite sides of said overvoltage protection device, and spring bias means for resiliently urging said movable contacts together into engagement with said ring to connect said one electrode to ground and to releasably mount said device on said base member.

8. Apparatus in accordance with claim 7 in which the movable contacts are of a cross shape with the arms of said cross being resiliently urged by said spring means into engagement with said terminal members when said ring melts.

9. Apparatus in accordance with claim 6 in which the overvoltage protection device is secured within a hollow holder means of insulating material for insertion and removal of said device into and out of engagement with said contacts by movement of said holder means.

10. Apparatus in accordance with claim 9 in which a cover member is releasably attached to said base member to form a housing containing said device and said holder means.

* * * * *